(12) United States Patent
Devenyi

(10) Patent No.: US 6,288,855 B1
(45) Date of Patent: Sep. 11, 2001

(54) PRELOADED DEVICE HAVING COMPONENTS WITH AN AXIALLY ALIGNED MOVEMENT

(75) Inventor: Gabor Devenyi, Penetang (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/393,481

(22) Filed: Sep. 10, 1999

(51) Int. Cl.⁷ .......................... G02B 27/02; G02B 15/14
(52) U.S. Cl. ............................... 359/830; 359/704
(58) Field of Search ..................... 359/822, 823, 359/828, 829, 830, 702, 703, 704, 694, 699, 701

(56) References Cited

U.S. PATENT DOCUMENTS

| | | | |
|---|---|---|---|
| 2,319,063 | * | 5/1943 | Hutchinson ............... 396/144 |
| 4,302,076 | * | 11/1981 | Hashimoto ............... 359/830 |
| 4,740,065 | * | 4/1988 | Aoyagi ................... 359/704 |
| 5,398,498 | * | 3/1995 | Mort et al. ............... 60/223 |
| 5,940,228 | * | 8/1999 | Burnett .................. 359/825 |

* cited by examiner

Primary Examiner—Georgia Epps
Assistant Examiner—Saeed Seyrafi
(74) Attorney, Agent, or Firm—William C. Schubert; Glenn H. Lenzen, Jr.

(57) ABSTRACT

A preloaded device includes a female component having a right-circular cylindrical internal surface and a first helical groove in the internal surface of the female component. A male component has a right-circular cylindrical external surface sized to be slidably received within the right-circular cylindrical internal surface of the female component, and a second helical groove in the external surface of the male component. The second helical groove has the same pitch as the first helical groove so that the second helical groove is in facing relationship along its length to the first helical groove when the male component is assembled to the female component. A spring component is received within the first helical groove and the facing second helical groove when the male component is assembled to the female component. The spring component has three shape distortions thereon equidistantly spaced around the circumference of the spring component so as to press the spring component against the first helical groove and the second helical groove. The device accomplishes a preloaded helical movement of the female component and the male component. The female component and/or the male component may support an optical lens, so that the preloaded device functions as a zoom lens.

20 Claims, 3 Drawing Sheets

PRELOADED DEVICE HAVING COMPONENTS WITH AN AXIALLY ALIGNED MOVEMENT

BACKGROUND OF THE INVENTION

This invention relates to a mechanical device having an axially aligned, linear axial movement between its components, and, more particularly, to a preloading arrangement that prevents backlash in the movement.

A number of types of mechanical devices include components that translate relative to each other while maintaining a precisely defined, axially aligned relationship. In an example of interest to the inventor, an optical zoom lens requires that tubular housings containing the optical elements translate along an optical axis to change the spacings of the optical elements. The housings may rotate about the optical axis, but must remain well-aligned along the optical axis so that the optical signal is not distorted.

For some zoom lenses, backlash and play in the movement is not a concern. However, in sophisticated zoom lens systems such as found in some sensing devices and display devices, there can be no backlash or play between the housings, as for example when the direction of axial movement is changed. The presence of backlash may lead to errors in the determination of the exact power of magnification of the zoom lens and in turn lead to errors in the output of the system.

Mechanical structures are available to prevent backlash in such mechanical systems having a linear axial movement. Precisely machined multi-start helicoil threads are sometimes used. In another approach, accurately positioned slot-and-pin arrangements have been employed, but these structures require post-fitting operations and extreme accuracy. These approaches are operable, but are expensive to implement because they require a high degree of precision. Additionally, the closely fitted elements may be susceptible to change when the temperature of operation changes. The latter is particularly of concern where different ones of the components are made of different materials so that the fit between them changes as a result of temperature changes.

There is a need for a simpler, less-complex, and less-expensive approach to the prevention of backlash and play in mechanical systems having a linear axial movement. The present invention fulfills this need, and further provides related advantages.

SUMMARY OF THE INVENTION

The present invention provides a mechanical device having a linear axial movement between components. The device is not susceptible to mechanical backlash when the direction of movement is reversed. The structure that maintains a preload on the components is readily manufactured and assembled, and does not require a high degree of precision. It uses only one element in addition to the linearly moving components. The axial alignment of the components is precisely maintained, and the structure is temperature compensated in the sense that the preload and alignment are maintained when the temperature is changed. The structure is not susceptible to misalignment or unpredictable changes as a result of mechanical shocks and vibrations. The approach is described herein with respect to a single pair of components, but it may be extended to cover multiple pairs components aligned along a common axis.

In accordance with the invention, a preloaded device comprises a female component having a right-circular cylindrical internal surface, a first helical recess in the internal surface of the female component, a male component having a right-circular cylindrical external surface sized to be slidably received within the right-circular cylindrical internal surface of the female component, and a second helical recess in the external surface of the male component. The second helical recess has the same pitch as the first helical recess so that the second helical recess is in facing relationship along its length to the first helical recess when the male component is assembled to the female component. A spring component is received within the first helical recess and the facing second helical recess when the male component is assembled to the female component. The spring component preferably has at least one shape distortion thereon so as to press the spring component against the first helical recess and the second helical recess. Most preferably, there are three approximately equidistantly spaced shape distortions.

A stop to the helical movement is optionally provided with a notch in the male component and a stop screw in the female component positioned to engage the notch when the male part is rotated to a maximum permitted rotation.

The structure of the invention does not utilize a conventional threaded structure, with a male thread in one component engaged to a female thread in the other component. Such arrangements produce backlash due to the mechanical tolerances between the threads introduced during manufacturing. Instead, the present approach utilizes a recess in both mating components. The spring component that is received in the two recesses locks the two components together so that they may move relative to each other along a helical path. The spring component exerts a spring force between the recesses, so that there is no backlash or play in the movement. The recesses, which are preferably in the form of grooves, need not be machined with tight (small) tolerances, reducing the cost of manufacture of the device.

The ability of the present structure to function with loose (large) tolerances and with materials of different types is an important feature. For example, it may be desirable to make the female component of plastic and the male component of metal. The plastic female component is injection molded, which usually results in rather large tolerances and a relatively rough surface on the part. The coefficient of thermal expansion of the plastic is also much different from that of the metal. The approach of the invention, with the two recesses and interlocking spring component, does not require close tolerances, good surface finishes, or a close match in the coefficients of thermal expansion to be operable. It is therefore well suited to such applications.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
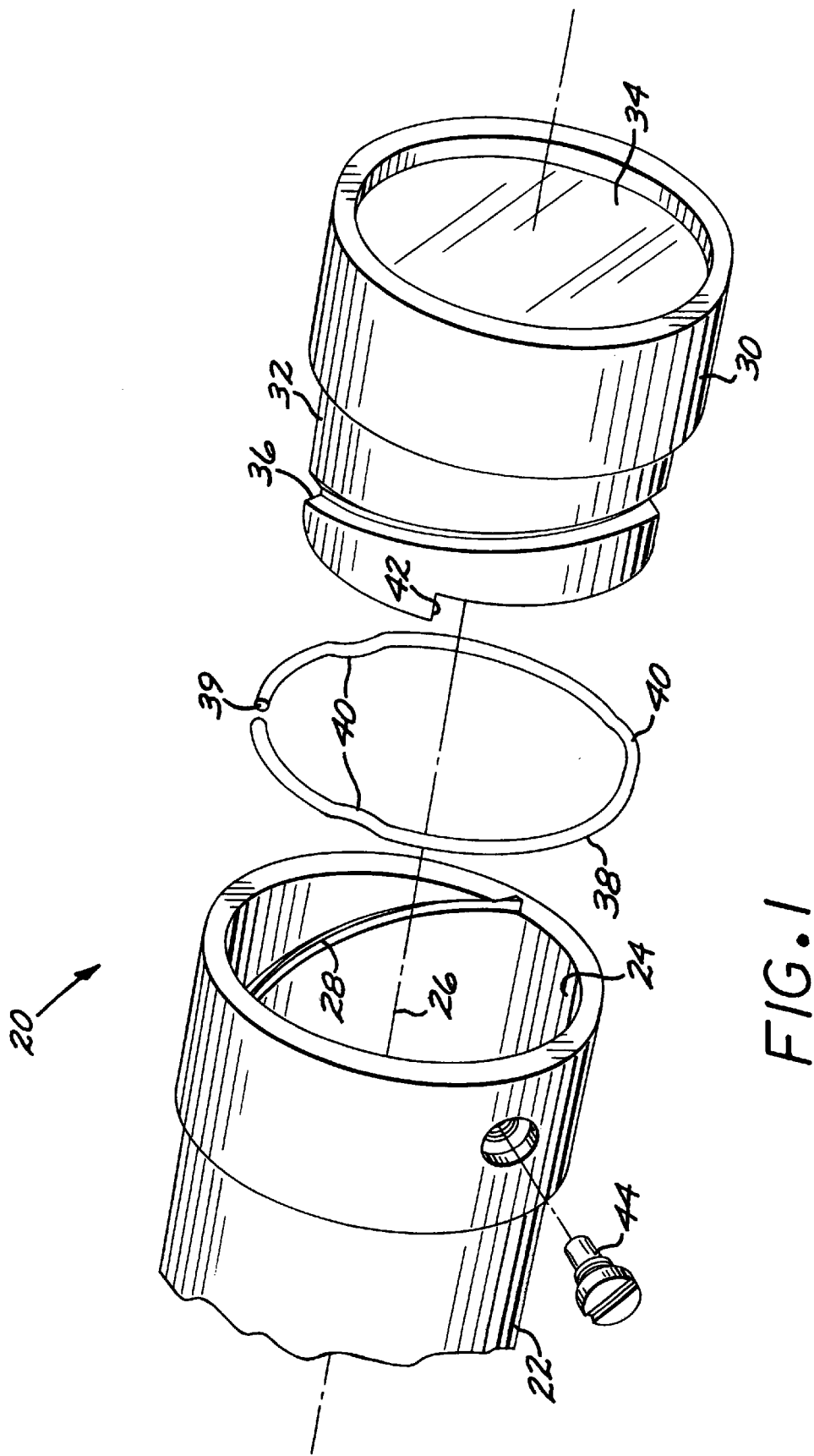
FIG. 1 is an exploded view of a device in accordance with the invention.

FIG. 1 depicts the preferred application of the invention in a zoom lens 20, although the invention may be utilized in other situations requiring a preloaded device as well. The zoom lens 20 includes a female component 22 having a right-circular internal surface 24 and a cylindrical axis 26. In this case, the female component 22 is a lens housing. The female component 22 has a first helical recess 28 machined, molded, or otherwise formed into the internal surface 24.

The zoom lens 20 further includes a male component 30 having a right-circular cylindrical external surface 32. In this case, the male component 30 is a focusing mount in which is supported an optical lens 34. The external surface 32 is sized to be slidably received with a smooth movement within the right-circular cylindrical internal surface 24 of the female component 22, so that the lens 34 lies on the cylindrical axis 26. Preferably, the internal surface 24 of the female component 22 has an internal-surface cylindrical diameter that is greater than an external-surface cylindrical diameter of the external surface 32 of the male component 30 by a clearance of from about 0.03 to about 0.05 millimeters.

The external surface 32 of the male component 30 includes a second helical recess 36. The second helical recess 36 has the same helical pitch as the first helical recess 28, so that the second helical recess 36 is in facing relationship at all locations along its length to the first helical recess 28 when the male component 30 is assembled to the female component 22. The second helical recess 36 need not be of the same cross-sectional shape as the first helical recess 28, although for convenience they are typically made the same.

Figure 2:
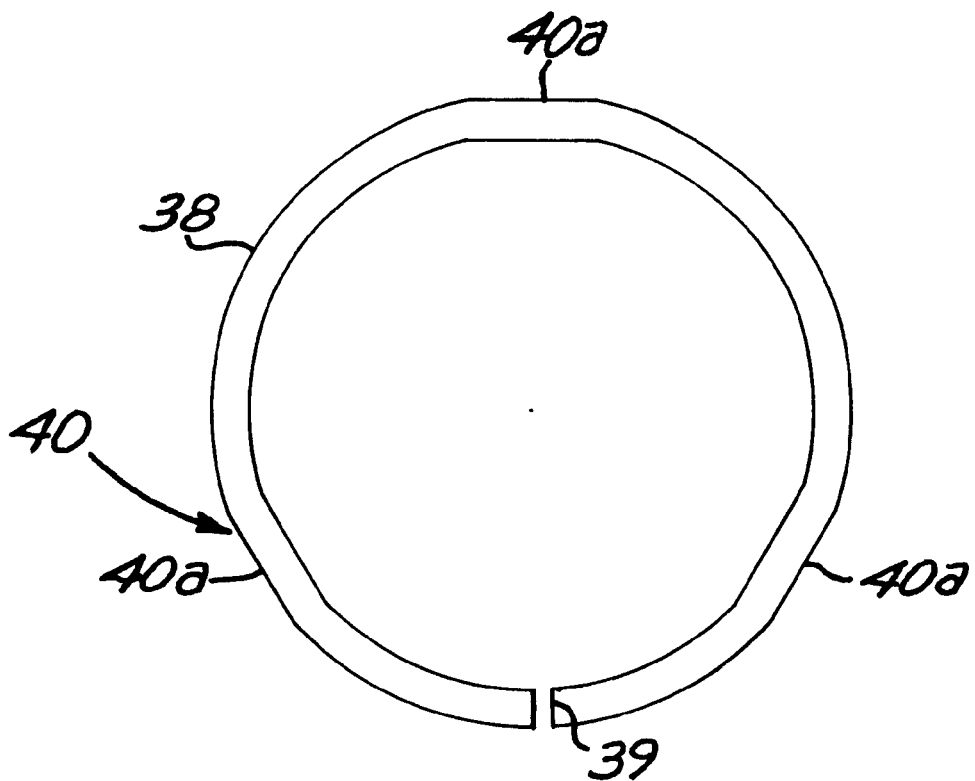
FIG. 2 is a plan view of a first form of distortion of the spring component.

A spring component 38 is received within the first helical recess 28 and the facing second helical recess 36 when the male component 30 is assembled to the female component 22. The illustrated and preferred form of the spring component 38 is a discontinuous ring with a slit 39 therethrough, prior to insertion in the recesses 28 and 36. The spring component 38 preferably extends at least about 360 degrees around the circumference of the male component 30, so that it supports the male component 30 around its circumference. However, the spring component 38 is at least partially operable if it extends less than 360 degrees around the circumference, but preferably not less than about 270 degrees. The spring component 38 may extend more than 360 degrees. The illustrated spring component 38 of FIGS. 1–2 is readily prepared as a discontinuous ring, which extends slightly less than 360 degrees when assembled into the recesses 28 and 36 having a relatively low pitch, and is fully functional to support and center the male component 30 within the female component 22. This form of the spring component 38 is readily assembled to the female component 22 and the male component 30.

The spring component 38 is preferably made of spring steel or music wire, with a circular cross-sectional shape. The music wire, a high-carbon steel drawn to a high strength and very smooth surface finish, is particularly preferred, because of its low coefficient of friction. This low coefficient of friction allows the music wire to work well with components 22 and/or 30 which have a relatively rough surface finish, such as plastics. Before placement into the recesses 28 and 36, the undeformed spring component 38 is substantially annular, planar, and circular, except for the slit 39 and as noted next.

The spring component 38 preferably, but not necessarily, has at least one shape distortion 40 thereon. Most preferably, there are three shape distortions 40, so that, after insertion of the spring component 38 into the recesses 28 and 36, the shape distortions 40 are approximately equally spaced at 120 degrees from each other around the circumference of the male component 30. The function of the distortion 40 is to press the spring component 38 against the first helical recess 28 and the second helical recess 36 when the male component 30 is assembled to the female component 22 with the spring component 38 disposed in the first helical recess 28 and the second helical recess 36.

The preloading structure is operable without the shape distortions, but the presence of the shape distortions 40 allows the helical recesses 38 and 36 to be made to looser (greater) tolerances than in their absence, while remaining functional. The greater the permitted tolerances, the less costly is the manufacture of the components and the wider the range of materials that may be used in the components.

Figure 3:
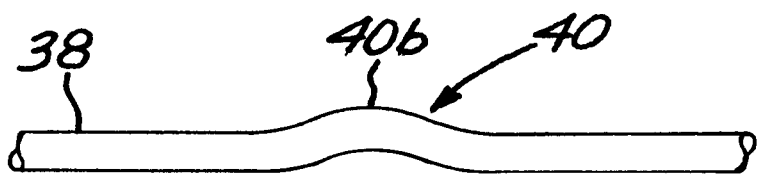
FIG. 3 is an elevational view of a second form of distortion of the spring component.

The shape distortion 40 may be of any operable type. FIGS. 2 and 3 illustrate two preferred forms of the distortion 40. In FIG. 2, the distortion 40 is a radial flattening 40a of the curvature of the spring component 38 (which is otherwise substantially circular) at a location on its circumference. Each flattening 40a typically extends over about 20–40 degrees of circumference of the spring component 38, although this circumferential extent may be varied to alter the springiness of the spring component 38. This approach of FIG. 2 is most preferred, because it provides a reliable structure for achieving a controllable springiness of the spring component 38. In FIG. 3, the distortion 40 is an out-of-plane bending 40b of a region of the spring component 38, which is otherwise substantially planar before assembly into the helical recesses 28 and 36.

It is particularly preferred that there be provided at least three, and preferably exactly three, of the distortions 40, spaced equidistantly (i.e., 120 degrees apart) around the circumference of the male component 30. The equidistant positioning of the distortions 40 tends to center the spring component 38 in the helical recesses 28 and 36, thereby also centering the male component 30 in the female component 22.

The zoom lens 20 is optionally provided with a stop which limits the extent of rotation about the cylindrical axis 26 and linear travel along the cylindrical axis 26 of the male component 30 with respect to the female component 22. In an illustrated preferred form, the stop includes a notch 42 in the male component 30, and a stop screw 44 in the female component 22 positioned to engage the notch 42 when the male component 30 is rotated to a maximum permitted rotation. During assembly, the stop screw 44 is backed out to permit insertion of the spring component 38 and assembly of the male component 30 to the female component 22, and thereafter screwed in so that it engages the notch 42 when the male component 30 reaches the maximum permitted rotation. In the absence of a stop, the male component 30 is permitted to rotate and translate along the cylindrical axis 26 without limit except for the extent of the lengths of the recesses.

Figure 4:
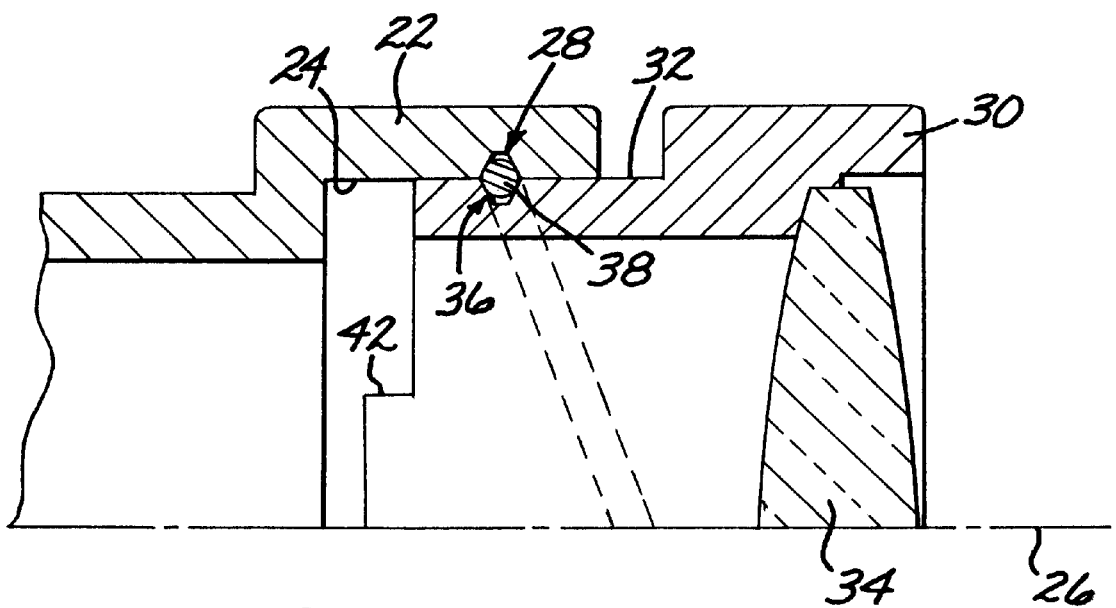
FIG. 4 is a partial sectional view of the device of FIG. 1 after assembly, taken through the cylindrical axis of the device.
Figure 5:
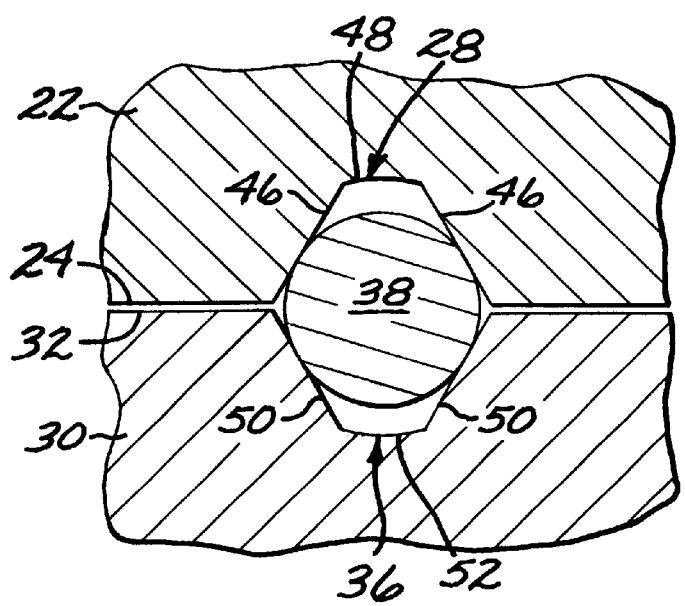
FIG. 5 is an enlarged detail of FIG. 4, illustrating the recesses and spring component placement.

FIG. 4 illustrates the assembled structure of the zoom lens 20, and FIG. 5 is a further detail of the recesses 28 and 36 and the spring component 38. During assembly, the split spring component 38, which is made with a diameter that is slightly oversize for the first helical recess 28, is placed into the first helical recess 28 by compressing it at the slit 39. When the male component 30 is thereafter assembled to the female component 22, the spring component 38 is positioned within the two helical recesses 28 and 36. The spring component 38 thereby retains the male component 30 within the female component 22, but permits the male component 30 to rotate about the cylindrical axis 26 and translate along the cylindrical axis 26 according to the helical pitch of the recesses 28 and 36.

The recesses 28 and 36 are preferably both grooved in form, as illustrated in FIG. 5. The sides 46 of the first helical recess 28 preferably converge at an included angle of about 60 degrees with increasing distance from the internal surface 24 so as to receive the spring component 38 against the sides 46. The first helical recess 28 may have a flat bottom 48, may be radiused in the manner of a standard thread-cut profile (as illustrated), or may have any other shape that is convenient and does not interfere with the operation of the spring component 38. Similarly, the sides 50 of the second helical recess 36 preferably converge at an included angle of about 60 degrees with increasing distance from the external surface 32 so as to receive the spring component 38 against the sides 50. The second helical recess 36 may have a flat bottom 52, may be radiused in the manner of a standard thread-cut profile (as illustrated), or may have any other shape that is convenient and does not interfere with the operation of the spring component 38.

With the aid of the optional shape distortions 40, the spring component 38 presses against the sides 46 and 50 of the respective recesses 28 and 36 to form an engagement between the female component 22 and the male component 30 that is free of play and backlash. This arrangement allows the helical recesses 28 and 36 to be machined or otherwise formed into the respective female component 22 and male component 30 with loose tolerances and without the need for high precision, an important engineering and manufacturing advantage. The internal surface 24 and the external surface 32 may be machined with a high degree of precision so that there is a good alignment of the male component 30 and the female component 22 for optical purposes, and there are smooth rotational and axial movements of the male component 30 relative to the female component 22. However, the precision machining of cylindrical surfaces is easier and less expensive than the precision machining of helical recesses. The surfaces 24 and 32 may instead be machined with a lesser precision, but even in that case the spring component 38 centers the male component 30 relative to the female component 32 with the result that reasonably good axial alignment is maintained.

The use of the spring component 38 also provides temperature compensation for the rotational and axial movements of the male component 30 and the female component 22. When two cylindrical components are engaged to each other with a positive thread on one component and a recess on the other component, there may be binding of the threads when the temperature is changed as a result of thermal expansion, particularly in those situations where the components are not made of the same material and have different coefficients of thermal expansion. In the present case, the use of two recesses 28 and 36 and the spring component 38 engagement, rather than a positive thread and a recess, allows the deformation of the spring component to accommodate the changes in dimension associated with the change in temperature. The result is a movement that does not bind when the temperature changes, an important advantage.

The present invention has been reduced to practice for a zoom lens, as discussed above. It has been found to be fully functional as described.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A preloaded device comprising
   a female component having a right-circular cylindrical internal surface and a cylindrical axis;
   a first helical recess in the internal surface of the female component;
   a male component having a right-circular cylindrical external surface sized to be slidably received within the right-circular cylindrical internal surface of the female component;
   a second helical recess in the external surface of the male component, the second helical recess having a helical pitch which is the same as that of the first helical recess, so that the second helical recess is in facing relationship along its length to the first helical recess when the male component is assembled to the female component; and
   a spring component received within the first helical recess and the facing second helical recess when the male component is assembled to the female component, wherein the spring component has an annular, planar, circular shape with a radial slit therein prior to positioning within the first helical recess and the second helical recess.

2. The device of claim 1, wherein at least one of the female component and the male component supports an optical lens.

3. The device of claim 1, wherein the female component has an internal-surface cylindrical diameter of the internal surface that is greater than an external-surface cylindrical diameter of the external surface of the male component by a clearance of from about 0.03 to about 0.05 millimeters.

4. The device of claim 1, wherein the first helical recess has a shape of a first groove having converging sides.

5. The device of claim 1, wherein the second helical recess has a shape of a second groove having converging sides.

6. The preloaded device of claim 1, wherein the spring component has at least one shape distortion thereon so as to press the spring component against the first helical recess and the second helical recess.

7. The device of claim 6, wherein the spring component has exactly three shape distortions thereon, arranged equidistantly around a circumference of the spring component.

8. The device of claim 6, wherein each shape distortion comprises a bend in the spring component extending generally parallel to the cylindrical axis.

9. The device of claim 6, wherein each shape distortion comprises a flat region extending circumferentially relative to the spring component.

10. The device of claim 1, wherein the stop includes
    a notch in the male component, and
    a stop screw in the female component positioned to engage the notch when the male component is rotated to a maximum permitted rotation.

11. The device of claim 1, wherein the female component and the male component together comprise a zoom lens.

12. The device of claim 1, wherein the female component is made of plastic and the male component is made of metal.

13. The device of claim 1, wherein the device further includes:
    a stop limiting the extent of rotation of the male component with respect to the female component.

14. The device of claim 1, wherein the spring component is made of steel.

15. A preloaded device comprising
   a female component having a right-circular cylindrical internal surface and a cylindrical axis;
   a first helical groove in the internal surface of the female component, the first helical groove having converging sides;
   a male component having a right-circular cylindrical external surface sized to be slidably received within the right-circular cylindrical internal surface of the female component, wherein at least one of the female component and the male component supports an optical lens;
   a second helical groove in the external surface of the male component, the second helical groove having converging sides, the second helical groove having the same helical pitch as the first helical groove so that the second helical groove is in facing relationship along its length to the first helical groove when the male component is assembled to the female component;
   a noncontinuous spring component received within the first helical groove and the facing second helical groove when the male component is assembled to the female component, the spring component having exactly three shape distortions thereon equidistantly spaced around the circumference of the spring component so as to press the spring component against the first helical groove and the second helical groove; and
   a stop limiting the extent of rotation of the male component with respect to the female component.

16. The device of claim 15, wherein the female component has an internal-surface cylindrical diameter of the internal surface that is greater than an external-surface cylindrical diameter of the external surface of the male component by a clearance of from about 0.03 to about 0.05 millimeters.

17. The device of claim 15, wherein the shape distortion comprises a bend in the spring component extending generally parallel to the cylindrical axis.

18. The device of claim 15, wherein the shape distortion comprises a flat region extending radially with respect to the cylindrical axis.

19. The device of claim 15, wherein the stop includes
   a notch in the male component, and
   a stop screw in the female component positioned to engage the notch when the male component is rotated to a maximum permitted rotation.

20. The device of claim 15, wherein the female component is made of plastic and the male component is made of metal.

\* \* \* \* \*